(12) United States Patent
Yamada (10) Patent No.: US 6,448,850 B1
(45) Date of Patent: Sep. 10, 2002

(54) ELECTROMAGNETIC WAVE AMPLIFIER AND ELECTROMAGNETIC WAVE GENERATOR

(75) Inventor: Minoru Yamada, Kanazawa (JP)

(73) Assignee: Kanazawa University, Kanazawa (JP)

( * ) Notice: Subject to any disclaimer, the term of this patent is extended or adjusted under 35 U.S.C. 154(b) by 0 days.

(21) Appl. No.: 09/574,252

(22) Filed: May 19, 2000

(30) Foreign Application Priority Data

May 20, 1999 (JP) ............................................ 11-139890

(51) Int. Cl.[7] .................................................. H01J 25/00
(52) U.S. Cl. .............................. 330/44; 331/79; 315/4; 315/5
(58) Field of Search ........................... 315/415; 330/44; 331/79

(56) References Cited

U.S. PATENT DOCUMENTS

| | | | | |
|---|---|---|---|---|
| 3,340,416 A | * | 9/1967 | Young | 315/4 |
| 3,860,880 A | * | 1/1975 | Yoriv et al. | 315/4 X |
| 4,331,934 A | * | 5/1982 | Morrison et al. | 331/79 |
| 4,727,550 A | * | 2/1988 | Chang et al. | 315/4 X |

FOREIGN PATENT DOCUMENTS

| | | |
|---|---|---|
| JP | 10270808 | 10/1998 |
| JP | 11135861 | 5/1999 |
| JP | 2000-68577 | 3/2000 |

\* cited by examiner

Primary Examiner—Benny Lee
(74) Attorney, Agent, or Firm—Venable; Michael A. Sartori; Jeffrey W. Gluck (57) ABSTRACT

An electromagnetic wave amplifier and an electromagnetic wave generator operate using electron beams in a vacuum environment. The amplifier, arranged in a vacuum environment, comprises an electron emitting section for emitting electron beams and an amplifying section for amplifying an inputted electromagnetic wave in one direction by utilizing energy received from an electron beam emitted from the electron emitting section and traveling in the vacuum along a dielectric waveguide having a wave-shaped form. The generator, also arranged in a vacuum environment, comprises an electron emitting section for emitting electron beams and an oscillating section for generating an electromagnetic wave by utilizing electron beams emitted from the electron emitting section and travelling in the vacuum along a dielectric waveguide having a composite wave-shaped form.

8 Claims, 4 Drawing Sheets

ELECTROMAGNETIC WAVE AMPLIFIER AND ELECTROMAGNETIC WAVE GENERATOR

BACKGROUND OF THE INVENTION

1. Field of the Invention

The present invention relates to an electromagnetic wave amplifier for amplifying an electromagnetic wave in one direction and an electromagnetic wave generator for generating an electromagnetic wave which are applicable in a lot of fields of electronic engineering, communication engineering, electromagnetic wave, engineering, electron device engineering, quantum electronic engineering, optical electronics, and laser engineering, etc.

2. Related Art Statement

Electronics progresses toward the object of developing technology which transmits and processes more mass information at higher speeds. To this end, in electronic technology, the technology which treats a higher frequency domain has been developed, and it has come to treat even the region of light which reaches a high frequency of $10^{15}$ Hz as electronic engineering.

However, in the range from the microwave to the optical regions, transistors and ICs, which are the leading part of electronics, can not be used. As a result, special elements and methods are used instead, and various technical restrictions exist.

In the optical region ($10^{14}$–$10^{15}$ Hz), the laser is used as an active device for generating and amplifying the signal, but in the laser, both the travelling signal and the retreating signal are amplified. In a word, in the laser, signal amplification does not become unidirectional (non-reversible), but becomes bilateral (reversible). The bilateral amplifying characteristic of the laser is contrasted with the unidirectional amplifying characteristic of the transistor and the electric vacuum tube, considering that the logical operation on the computer becomes possible by utilizing the unidirectional amplifying characteristic, the information processing controlling light itself cannot be achieved with the use of the laser as an active device in the optical region ($10^{14}$–$10^{15}$ Hz).

In the microwave region ($10^9$–$10^{11}$ Hz), the traveling wave tube is used as a unidirectional active device. The traveling wave tube is a unidirectional electric vacuum tube having the highest operation frequency more than the upper limit (about 1 GHz=$10^9$ Hz) of an operation frequency of a usual electric vacuum tube which is an unidirectional and a functional electronic device and a transistor. The travelling wave tube decreases a propagation velocity of the electromagnetic wave by using a delay transmission line made of metal. Energy will be given to the electromagnetic wave by the electron beam emitted from the electron gun, and energy loss according to the collision of the electron with a surrounding material and scattering is reduced by making the environment a vacuum condition.

The electromagnetic wave is amplified in the traveling wave tube when the speed of the electron beam and the velocity of propagation of the electromagnetic wave coincide, so that the electromagnetic wave propagating in the opposite direction is not amplified. However, the travelling wave tube cannot operate in frequency regions over $10^{11}$ Hz at the present time, because the upper limit of the operating frequency is determined by precise technology for metal manufacturing.

The frequency band of $10^{11}$–$10^{14}$ Hz belongs to a region of infrared rays from a submillimeter wave, but this region is an undeveloped region with respect to electronics. In another word, neither any amplifier nor any generator (oscillator) operating with coherent (the phase is controlled) electromagnetic wave has yet been put to practical use in this frequency region. The reason for a difficult use of the above region is that this region has a frequency band with irregular phenomena such as an electron scatterings (collisions) in the material and thermal molecular motions, etc. However, technological development in the frequency region of $10^{11}$–$10^{14}$ Hz provides not only a technology for the solution of environmental problems of the detection of the contamination quality in the atmosphere, but also a technology which enables the transmission of extra-large capacity in an optical communication system which uses it as a carrier frequency.

There are free electron lasers and Cerenkov masers (microwave amplification by stimulated emission of light radiation) having the property of unidirectional amplification operation as devices in which generation and the amplification of an electromagnetic wave are possible from the microwave region to the optical region. The free electron laser is an optical generator capable of being oscillated in wide-ranging wave lengths, and the light receives an energy of the electron beam propagated in one direction in a vacuum by using a mechanism of operation different from other types of lasers, so that the free electron laser has a characteristic of amplifying only the light component propagated in the same direction as that of the electron beam. However, the free electron laser was developed aimed at the generation of light, so that the design of the amplifier having the above unidirectional amplifying property is not performed. In addition, in the free electron laser and the Cerenkov maser, operating voltage (excitation voltage of the electron beam) is extremely high, being 1 MV or more, and an extremely strong magnetic field is needed to give the electron beam the vibration, so that the utilization for electronics is difficult since the above laser and maser are developed aiming at a special high-energy usage.

To solve above described various problems, the present inventor has previously proposed a unidirectional optical amplifier which uses an electron beam in a solid material in Japanese Patent Application Laid-open No. 270808/1998. In this unidirectional optical amplifier, it is theoretically shown to achieve unidirectional amplification of light (electromagnetic wave), by combining the electron beam travelling path for the electron beam emitted in the solid material and the dielectric substance delay waveguide for delaying light to be amplified.

Moreover, to solve the above described various problems, the present inventor has previously proposed an electric vacuum tube type unidirectional optical amplifier which uses an electron beam emitted in a vacuum in Japanese Patent Application No. 293819/1997. In this electric vacuum tube type unidirectional optical amplifier, by using a pair of mirrors having wave shaped form arranged in a vacuum and for forming a delay waveguide of light, and by utilizing the energy received from the electron beam emitted from the electron emitting section, it is theoretically shown to achieve unidirectional amplification of light (electromagnetic wave) by constituting an optical amplifying section which amplifies input light in one direction.

In addition, to solving the above described various problems, the present inventor has previously proposed a unidirectional optical amplifier which uses an electron beam emitted in a vacuum in Japanese Patent Application No. 231251/1998. In this unidirectional optical amplifier, it is theoretically shown to achieve unidirectional amplification of light (electromagnetic wave), by combining the electron beam travelling path for the electron beam emitted in the vacuum and a dielectric waveguide for delaying light to be amplified.

In the unidirectional optical amplifier of the prior application (Japanese Patent Application Laid-open No. 270808/1998) of the present inventor, an electron cannot travel when the acceleration voltage exceeds 2.5V in the case of constituting the electron beam travelling path with, for example, ZnSe, so that the acceleration voltage of the electron beam cannot be increased, and the spatial phase change in the electromagnetic field becomes extremely imperceptible, and thus the manufacture of the delay waveguide would need an accuracy on the order of ten nm. In the electric vacuum tube type unidirectional optical amplifier of the above prior application (Japanese Patent Application No. 293819/1997) of the present inventor, a mirror having a wave shaped surface would need to be manufactured with an accuracy on the order of ten mn. Although, the manufacturing technology with accuracy on the order of ten nm is available nowadays, easier fabrication of the device with a lower operating voltage is expected with further progress of a manufacturing technology in the future. In the unidirectional optical amplifier of the above prior application (Japanese Patent Application No. 231251/1998) of the present inventor, an operating voltage on the order of tens of KV is required since light is delayed by a straight dielectric waveguide. Thus, the decrease of operating voltage becomes a problem.

SUMMARY OF THE INVENTION

It is an object of the present invention to solve the above problems by realizing as an electromagnetic wave amplifier, which achieves unidirectional amplification of the electromagnetic wave in the region from the microwave to the optical frequencies, and which has seemed to be impossible up to now, with the use of the electron in a vacuum and the electromagnetic wave seeping in vacuum from a dielectric waveguide.

It is another object of the present invention to provide, as an electromagnetic wave generator, a device which uses electrons in a vacuum and an electromagnetic wave seeping from a dielectric waveguide in the vacuum, and which generates an electromagnetic wave in the region from the microwave to optical frequencies, which has seemed to be impossible up to now.

According to the present invention, there is provided an electromagnetic wave amplifier arranged in a vacuum environment, and comprising an electron emitting section for emitting electron beams, and an amplifying section for amplifying an inputted electromagnetic wave in one direction by utilizing energy received from electron beam emitted from the electron emitting section and travelling in the vacuum, characterized in that the amplifying section consists of a dielectric substrate having a dielectric waveguide formed thereon in an electron beam travelling direction and a pair of electrodes for the electron beam focusing arranged to clip the dielectric waveguide from opposite sides; the dielectric waveguide causes an electric field component of the electromagnetic wave in the electron beam travelling direction by overlapping a part of the inputted electromagnetic wave and the electron beam emitted from the electron emitting section; and the surface of the dielectric waveguide is processed to a wave shaped form of a given periodic length so as to decrease the travelling speed of the electromagnetic wave in the electron beam travelling direction.

According to the amplifier of the present invention, the dielectric substrate has an input waveguide and an output waveguide which are connected to the ends of the dielectric waveguide respectively through curved portions in the orthogonal direction.

In an embodiment of the electromagnetic wave amplifier according to the present invention, the dielectric waveguide is a material of high refractive index having transparency in an operating wave length region. The dielectric waveguide may consist of II–VI group compound semiconductors such as ZnSe, CdS, and these mixed crystals or III–V group compound semiconductors such as GaN when using the dielectric waveguide for the visible light region, and it may consist of IV group semiconductors such as Si and Ge, II–VI group compound semiconductors such as ZnSe, CdS, and these mixed crystals or III–V group compound semiconductors such as GaAs, InP, GaN, and these mixed crystals when using the dielectric waveguide from the microwave region to the near infrared light region.

According to the present invention, there is provided an electromagnetic wave generator arranged in a vacuum environment, and comprising an electron emitting section for emitting electron beams, and an oscillating section for generating an electromagnetic wave by utilizing electron beams emitted from the electron emitting section and travelling in vacuum, characterized in that the oscillation section consists of a pair of electrodes for the electron beam focusing arranged to clip the dielectric waveguide from opposite sides and a dielectric substrate on which a dielectric waveguide is formed in the electron beam travelling direction; the dielectric waveguide generates an electric field component of the electromagnetic wave in the electron beam travelling direction by overlapping a part of the electromagnetic wave generated from the electron emitting section and travelling in the vacuum, and the electron beams emitted from the electron emitting section; the surface of the dielectric waveguide is processed to a composite wave shape formed by combining two kinds of cycle lengths in order both to decrease the travelling speed of the electromagnetic wave in the electron beam travelling direction by one cycle length and to give a resonance effect for oscillating the electromagnetic wave by the other cycle length.

In a preferable embodiment of the electromagnetic wave generator according to the present invention, the dielectric substrate comprises a power output waveguide connected to the terminal portion of the dielectric waveguide through a curve part from an orthogonal direction thereof.

In a further preferable embodiment of the electromagnetic wave generator according to the present invention, the dielectric waveguide is a material of high refractive index having transparency in an operating wave length region, and it may consist of II–VI group compound semiconductors such as ZnSe, CdS, and these mixed crystals or II–V group compound semiconductors such as GaN when using the dielectric waveguide for the visible light region, and it may consist of IV group semiconductors such as Si and Ge, II–VI group compound semiconductors such as ZnSe, CdS, and these mixed crystals or III–V group compound semiconductors such as GaAs, InP, GaN, and these mixed crystals when using the dielectric waveguide from the microwave region to the near infrared light region.

According to the amplifier of the present invention, the electromagnetic wave input to the amplifying section arranged in a vacuum seeps in part from the dielectric waveguide in the vacuum when the electromagnetic wave propagates in the dielectric waveguide formed in the electron beam travelling direction of the dielectric substrate which constitutes the amplifying section, and the electric field component of the electromagnetic wave is caused by intersecting the seeped electromagnetic wave and the electron beam travelling in the vacuum and emitted from the electron emitting section. In that case, the travelling speed of the electron beam travelling direction of the electromagnetic wave decreases depending on a wave shaped form of a given cycle length on the surface of the dielectric waveguide and on the effective refractive index of the dielectric waveguide, so that the electric field component of the electromagnetic wave receives energy from the electron beam (the electron beam travels in the vacuum, so energy loss according to scattering due to the collision with a surrounding material is reduced) and the electromagnetic wave is amplified in one direction.

Further, according to the amplifier of the present invention, the travelling speed of the electromagnetic wave in the electron travelling direction is delayed in the dielectric waveguide formed in the amplifying section, and the electric field component of the electromagnetic wave is generated by intersecting the electromagnetic wave which seeps in the vacuum and the electron beam travelling in the vacuum, so that the electromagnetic wave amplifier performing the unidirectional amplification of the electromagnetic wave, can be achieved by using the electron in the vacuum and the electric field component of the electromagnetic wave. Moreover, the electromagnetic wave amplifier chiefly depends on a wave shaped form of a given cycle length on the surface of the dielectric waveguide and decreases the travelling speed of the electron beam travelling direction of the electromagnetic wave, so that operating voltage can be greatly decreased compared with the unidirectional optical amplifier of Japanese Patent Application No. 231251/1998.

According to the amplifier of the present invention, the dielectric substrate has the input waveguide and the output waveguide connected from the orthogonal direction to both ends of the dielectric waveguide, respectively, through curve parts, so that after the electromagnetic wave is amplified by the dielectric waveguide, the electromagnetic wave led from the input waveguide can be output from the output waveguide.

The dielectric waveguide of the present amplifier is a material of high refractive index having transparency in an operating wave length region, and it may consist of II–VI group compound semiconductors such as ZnSe, CdS, and these mixed crystals or III–V group compound semiconductors such as GaN when using the dielectric waveguide for the visible light region, and it may consist of IV group semiconductors such as Si and Ge, II–VI group compound semiconductors such as ZnSe, CdS, and these mixed crystals or III–V group compound semiconductors such as GaAs, InP, GaN, and these mixed crystals when using the dielectric waveguide from the microwave region to the near infrared region.

According to the generator of the present invention, in accordance with the electron beam emitted from the electron emitting section and travelling in the vacuum, the electromagnetic wave is generated in the electron beam travelling direction in the dielectric waveguide formed on the dielectric substrate constituting the oscillating section. A part of the electromagnetic wave seeps from the dielectric waveguide in the vacuum, and the electric field component of the electromagnetic wave is caused by intersecting the seeped electromagnetic wave and the electron beam travelling in the vacuum and emitted from the electron emitting section. In that case, the travelling speed of the electron beam travelling direction of the electromagnetic wave decreases, depending on one of two kinds of cycle lengths of surfaces of the dielectric waveguide and the effective refractive index of the dielectric waveguide, so that the electric field component of the electromagnetic wave receives energy from the electron beam (the electron beam travels in the vacuum, and thus, energy loss according to scattering due to the collision with a surrounding material is reduced). Here, when the other of the two kinds of cycle lengths satisfies a condition concerning the wave length of the electromagnetic wave and the gain coefficient becomes larger than the loss coefficient of the dielectric waveguide, the electromagnetic wave gets a resonance effect by the reflection in the dielectric waveguide, and the oscillation caused is in the desired frequency domain (range from the microwave region to an optical region).

According to the generator of the present invention, the electric field component of the electromagnetic wave is generated by overlapping the electromagnetic wave seeped in a vacuum and the electron beam travelling in the vacuum, and the electromagnetic wave is oscillated by delaying the travelling speed of the electromagnetic wave in the electron travelling direction in the dielectric waveguide formed to the oscillating section, so that the electromagnetic wave generator for generating the electromagnetic wave of the desired frequency domain, can be achieved.

Further, according to the generator of the present invention, the dielectric substrate comprises a power output waveguide connected to the terminal portion of the dielectric waveguide through a curve part from an orthogonal direction thereof, so that the electromagnetic wave becoming an electromagnetic wave in the desired frequency domain and generated in the dielectric waveguide can be output from the output waveguide.

According to the magnetic wave generator of the present invention, the dielectric waveguide is a material of high refractive index having the transparency in an operating wave length region. It may consist of II–VI group compound semiconductors such as ZnSe, CdS, and these mixed crystals or III–V group compound semiconductors such as GaN when using the dielectric waveguide for the visible light region, and it may consist of IV group semiconductors such as Si, Ge, and II–VI group compound semiconductors such as ZnSe, CdS, and these mixed crystals or III–V group compound semiconductors such as GaAs, InP, GaN, and these mixed crystals when using the dielectric waveguide from the microwave region to the near infrared light region.

DETAILED EXPLANATION OF THE PREFERRED EMBODIMENT

Now to the drawings, there are shown various embodiments of the electromagnetic wave amplifier and the electromagnetic wave generator according to the present invention. Like parts are shown by corresponding reference characters throughout several views of the drawings.

Figure 1A:
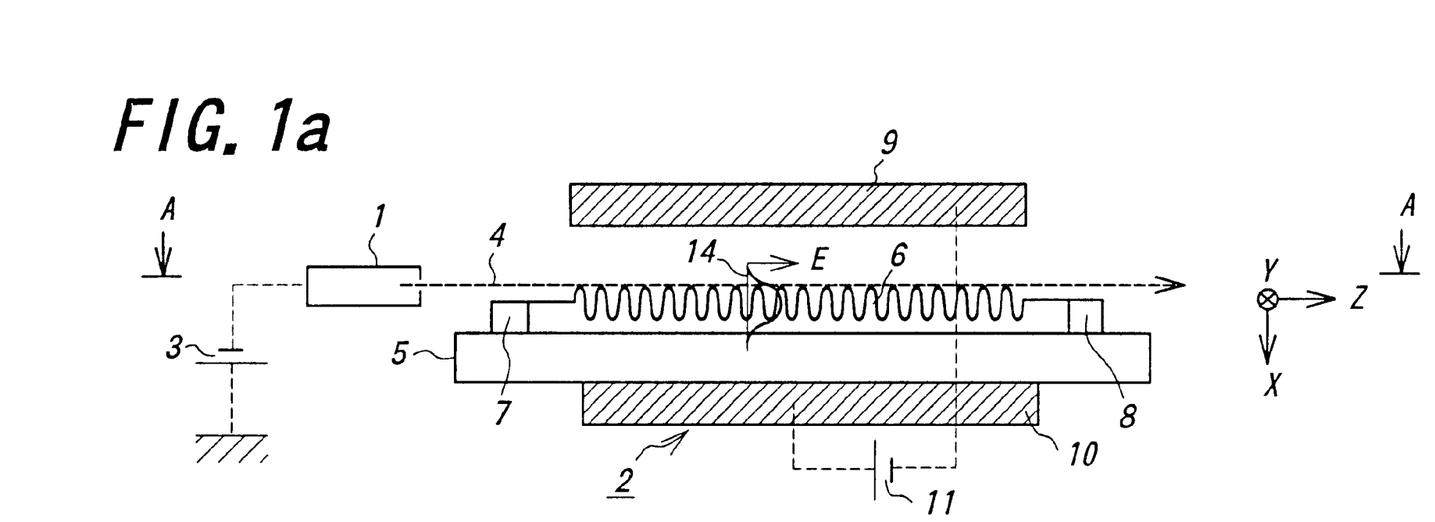
FIGS. 1(a) and 1(b) are a principle diagram and a sectional view taken along line A—A, respectively showing a basic structure of the electromagnetic wave amplifier of a first embodiment according to the present invention.
Figure 1B:
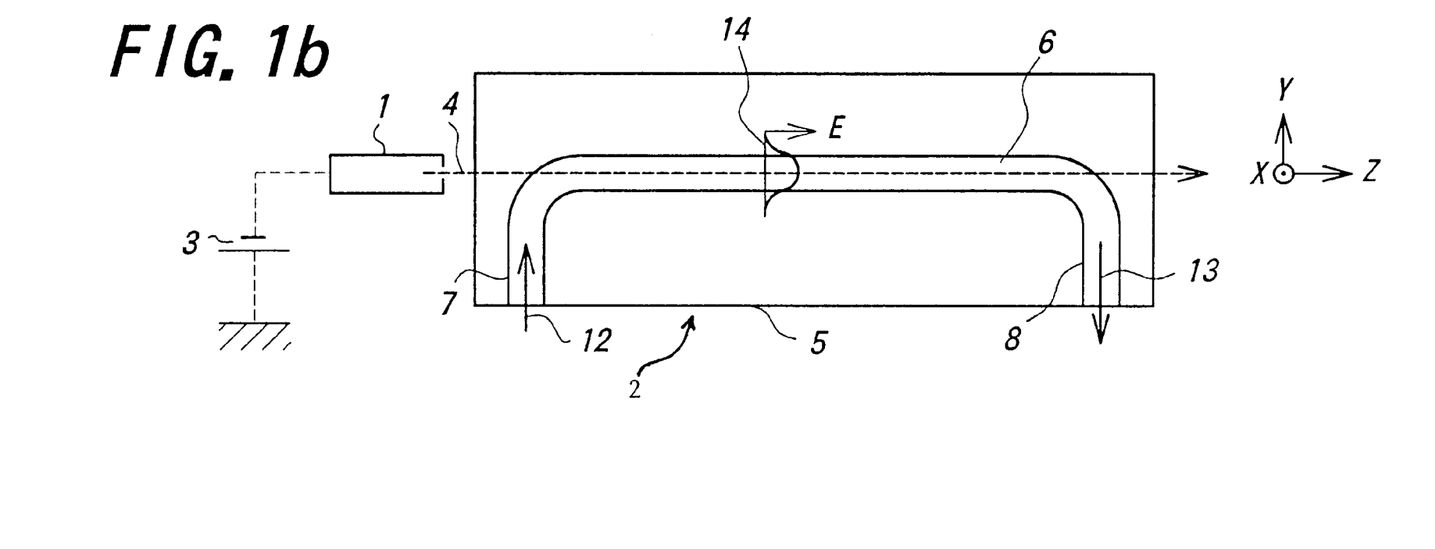

Hereafter, an embodiment according to the present invention is explained in detail based on the drawing. FIGS. 1(a) and 1(b) are a principle diagram and a sectional view taken along line A—A, respectively showing a basic structure of the electromagnetic wave amplifier of first embodiment according to the present invention. In FIGS. 1(a) and 1(b) as well as in FIG. 2, X represents the height direction, Y represents the width direction, and Z represents the electron beam travelling direction, as shown. The electromagnetic wave amplifier of the present embodiment consists of an electron emitting section 1 and an amplifying section 2 as shown in FIG. 1(a). The above electron emitting section 1 connected to a power source 3 and amplifying section 2 are arranged in a vacuum container (not shown) and are constituted as, for example, a device of an electron tube type. Moreover, as described above, the purpose of making environments of electron emitting section 1 and amplifying section 2 a vacuum is to prevent energy loss being caused by colliding with an unnecessary material and scattering when the electron emitted from the electron emitting section 1 passes through the amplifying section 2. The electron gun 1 radiates electron beam 4 by applying the acceleration voltage of a given voltage value with, for example, the use of an electron gun as above electron emitting section 1.

Figure 2:
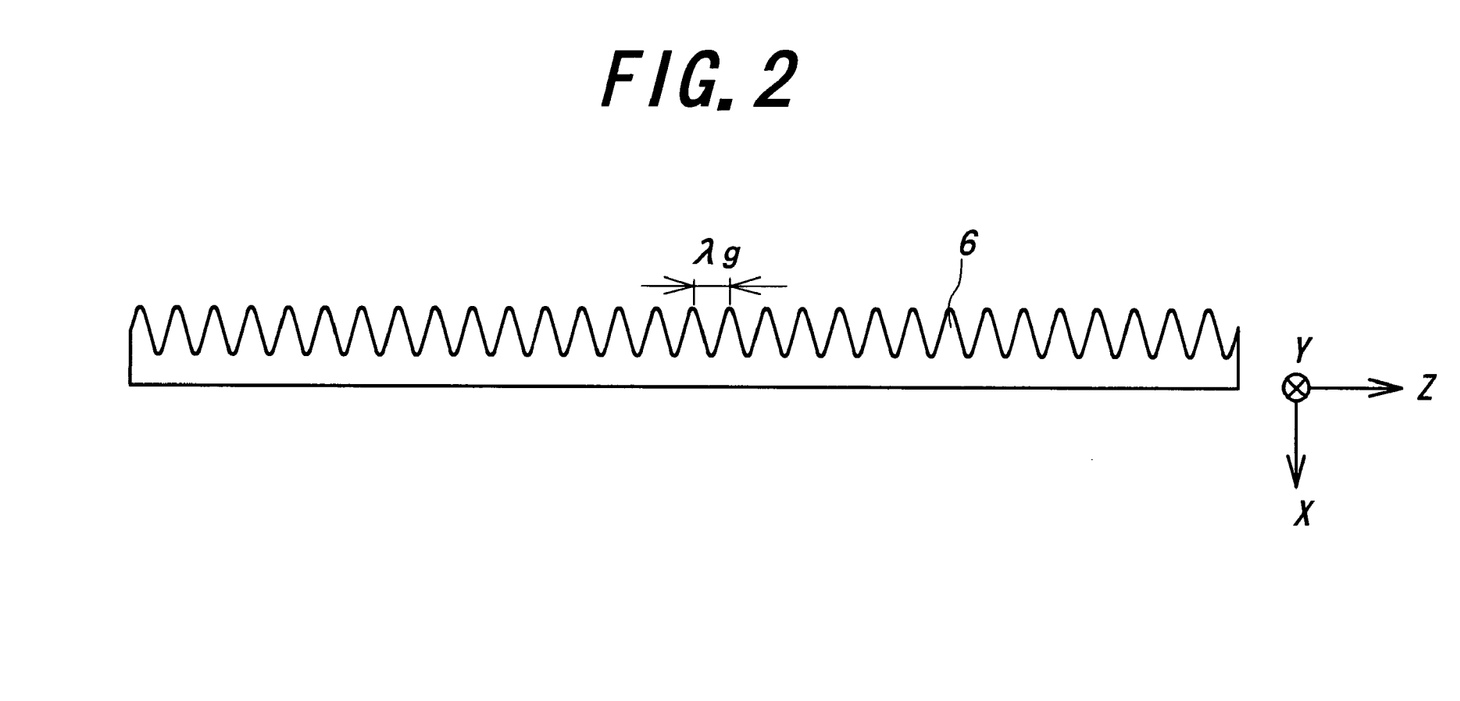
FIG. 2 is a detail drawing of the dielectric waveguide of the electromagnetic wave amplifier of the first embodiment.

The above amplifying section 2 comprises a dielectric substrate 5, a dielectric waveguide 6 formed on the dielectric substrate 5 in the electron beam travelling direction (shown in z axial direction), an input waveguide 7 and an output waveguide 8, each connected to right and left end sections, shown in the figure, of dielectric waveguide 6, respectively, through curve parts from the orthogonal direction as shown in FIG. 1(b), and a pair of electron beam focusing electrodes 9 and 10 oppositely arranged to sandwich the dielectric waveguide 6 in vertical direction, as shown in FIG. 1(a), and the electron beam focusing electrode 10 being connected lower surface of the dielectric substrate 5. As shown in FIG. 2, the above dielectric waveguide 6 has a surface (face on the electron travelling path side) which is processed or machined in a ruggedness or a corrugated wave shaped form of cycle length $\lambda g$, in order to delay the electromagnetic wave as described later. When electron beam focusing voltage 11 (see FIG. 1(a)) of a fixed voltage value is applied for the electron beam focusing electrode 9 side to become a negative potential, and for the electron beam focusing electrode 10 sides to become a positive potential between above mentioned electron beam focusing electrodes 9 and 10, electron beam 4, which travels along the electron beam travelling path formed in the upper part of dielectric waveguide 6 of dielectric substrate 5, is focused to the surface of dielectric waveguide 6.

Regarding the material constituting dielectric waveguide 6, a material in which the refraction index is as high as possible in the wave length of the utilized electromagnetic wave, and which has good transparency, is preferable. As a material corresponding to these conditions, II–VI group compound semiconductors such as ZnSe, CdS, and these mixed crystals or III–V group compound semiconductors such as GaN can be used when using the material for the visible light region, and IV group semiconductors such as Si and Ge, II–VI group compound semiconductors such as ZnSe, CdS, and these mixed crystals or III–V group compound semiconductors such as GaAs, InP, GaN, and these mixed crystals can be used when using the material from the microwave region to the near infrared light region.

As to the material which constitutes the above dielectric substrate 5, refractive index should be as low as possible, and the material, with respect to which the transparency, should be good in the wave length region of the utilizing electromagnetic wave. Quartz glass and organic matter, etc., can be used as a material corresponding to these conditions in all ranges from the microwave region to the visible light region. Metallic materials such as Ni, Ag, and Al and various alloys can be used as a material constituting above electron beam focusing electrodes 9 and 10.

Next, the principle of operation of the electromagnetic wave amplifier of the first embodiment is explained. Assuming that the angular frequency and the wave length of the electromagnetic wave (incident electromagnetic wave 12) are $\omega$ and $\lambda$, respectively, energy and the wave number of the electron emitted by the electron gun 1 are $W_b$ and $K_b$, respectively, energy and the wave number of the electron after energy is given to the electromagnetic wave are $W_a$ and $K_a$, respectively, Planck's constant is h, and effective refractive index of dielectric waveguide 6 is n, the electromagnetic wave is amplified in the case in which expressions (1) and (2) below are satisfied. In this case, the electromagnetic wave in the opposite direction is not amplified, since its wave length becomes negative and the electromagnetic wave in the opposite direction does not satisfy the expression (2). Moreover, the electromagnetic wave is not amplified if there is no electric field component of the electromagnetic wave in the electron travelling direction (z direction).

$$W_b - W_a = h \cdot \omega / 2\pi \qquad (1)$$

$$K_b - K_a = 2\pi n / \lambda + 2\pi / \lambda_g \qquad (2)$$

The above expression (1) shows the law of energy conservation between the electron and the electromagnetic wave, and the above expression (2) shows the momentum conservation rule between the electron and the electromagnetic wave. In general, $K_b - K_a \gg 2\pi n / \lambda$, so that for the electromagnetic wave being propagated in the free space, the momentum conservation rule of the above expression (2) is not satisfied, and thus the electromagnetic wave is not amplified. However, in this embodiment, the surface of the dielectric waveguide 6 is machined to a corrugated wave shaped form of cycle length fig, so that the travelling speed of the electron beam in the electron beam travelling direction decreases when propagating the electromagnetic wave in the dielectric waveguide 6. As a result, the above expression (2) is satisfied as a momentum conservation rule, and thus the amplification of the electromagnetic wave is achieved. Moreover, the propagation velocity in the dielectric waveguide 6 becomes c/n, so that effective refractive index n of the dielectric waveguide 6 contributes to decrease the travelling speed in the electron beam travelling direction of the electromagnetic wave, but the extent to which which this contributes to the decrease in the travelling speed, compared with the above corrugated wave shape, is relatively small.

Amplifying operation of the electromagnetic wave in the above amplifying section 2 is theoretically analyzed by using the density matrix method, which is an analysis technique of quantum mechanics, and gain coefficient g is shown by the following expression.

$$g = \frac{\mu_0 e \lambda JL}{nh} \xi CD$$

wherein $\mu_0$ is permeability in a vacuum, e is the charge of an electron, $\lambda$ is the wave length of the electromagnetic wave, J is the electric current density of the electron beam, L is the effective length of the amplifying section 2, n is the effective refractive index of the dielectric waveguide 6, h is Planck's constant, $\xi$ is a coupling coefficient between the electromagnetic wave and the electron beam, which is determined by spatially overlapping rate for electric field (E) component 14 of the electromagnetic wave and the electron beam as shown in FIGS. 1(a) and 1(b), C is another coupling coefficient between the electromagnetic wave and the electron beam caused by the wave shaped form, and D is a coefficient showing difference between the amplification and the absorption.

Amplification factor A of the electromagnetic wave in the amplifying section 2 is shown by the next expression.

$$A = \exp(gL) \quad (4)$$

In this case, an acceleration voltage $V_b$ necessary for amplifying the electromagnetic wave is shown by the following expression.

$$V_b = \frac{mc^2}{2e}\left(\frac{\lambda_g}{\lambda}\right)^2 \quad (5)$$

wherein m is a mass of electrons, and c is light velocity in free space. As is seen from the above expression (5), the more cycle length $\lambda_g$ of the wave shaped form of the dielectric waveguide 6 is made short, the more acceleration voltage $V_b$ can be lowered. However, the more cycle length $\lambda_g$ is made short, the more the combining rate C becomes small, and thus the gain coefficient g decreases, so that given a lower limit exists in the acceleration voltage $V_b$.

Next, the operation of the electromagnetic wave amplifier of the present embodiment is explained. As shown in FIG. 1(b), incident electromagnetic wave 12 is incident from the input waveguide 7 formed in an orthogonal direction to the electron beam travelling direction, and propagates through the dielectric waveguide 6 while being amplified after its direction is changed 90 degrees at the curve portion and is led to the dielectric waveguide 6. Subsequently, the electromagnetic wave 12 has its direction changed by 90 degrees at the curve portion and is led to the output waveguide 8, and further emanates there, resulting in an output electromagnetic wave 13.

In that case, the electromagnetic wave led to the dielectric waveguide 6 delays its travelling speed in the electron traveling direction, depending on the cycle length $\lambda_g$ of the wave shaped form on the surface of the dielectric waveguide 6 (and effective refractive index n of the dielectric waveguide 6), resulting in a speed of the extent to which energy is received from the electron beam 4 (the more the cycle length $\lambda_g$ is small, the more the speed of the electromagnetic wave is delayed). Moreover, the electromagnetic wave led to the dielectric waveguide 6 is distributed and guided so as to gather to the center of dielectric waveguide 6, but is not completely confined in the waveguide. A part of the electromagnetic wave propagated in dielectric waveguide 6 is seeped to the side of the dielectric substrate 5 and the vacuum side (electron beam travelling path side on the upper part of the dielectric substrate 5). The electromagnetic wave seeped to the vacuum side overlaps with the electron beam 4, so that electric field component 14 of the electron beam travelling direction (z direction), shown in a schematic diagram of FIG. 1(a) by E, results. As for the electric field component 14, the entire electromagnetic wave will be amplified due to reception of energy from the electron beam 4.

Figure 3A:
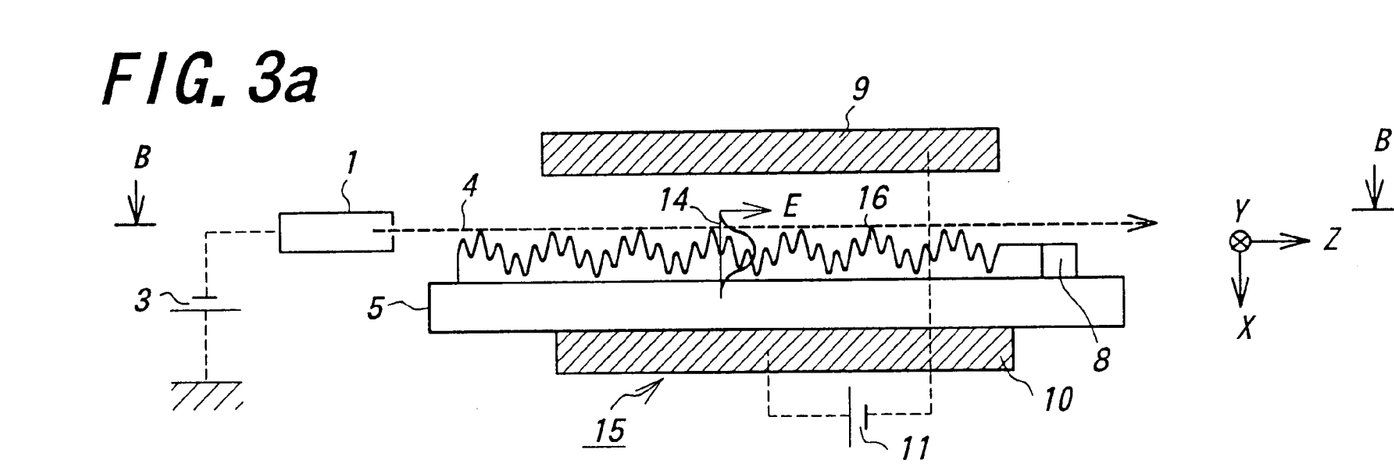
FIGS. 3(a) and 3(b) are a principle diagram chart and a sectional view taken along line B—B respectively showing a basic structure of the electromagnetic wave generator which lies an according to the present invention second embodiment.
Figure 3B:
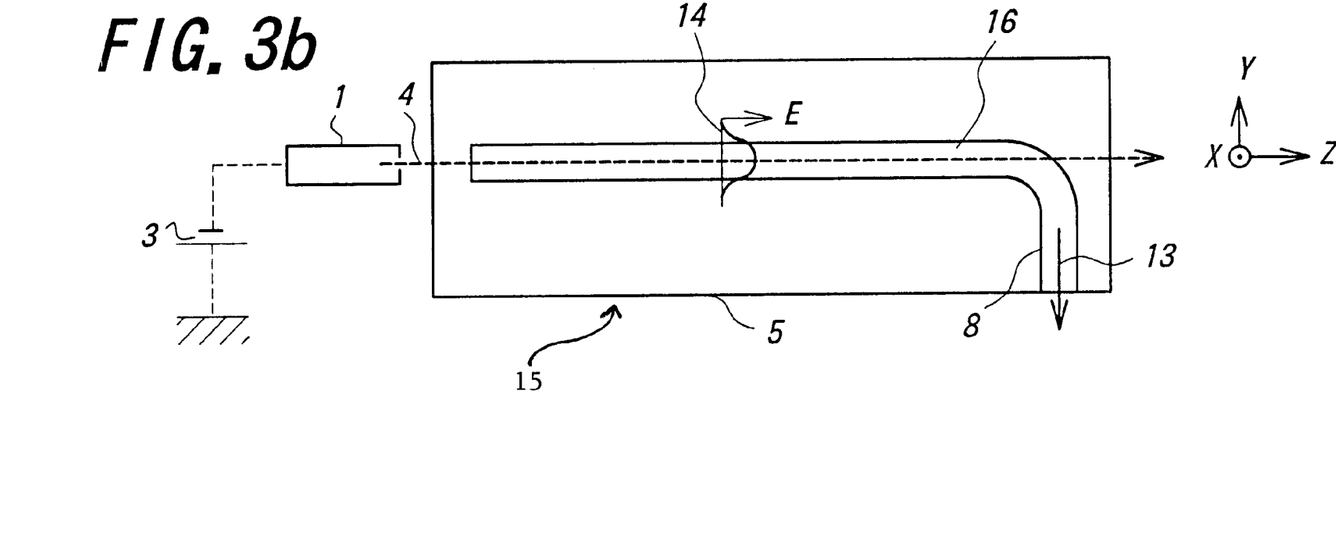
Figure 4:
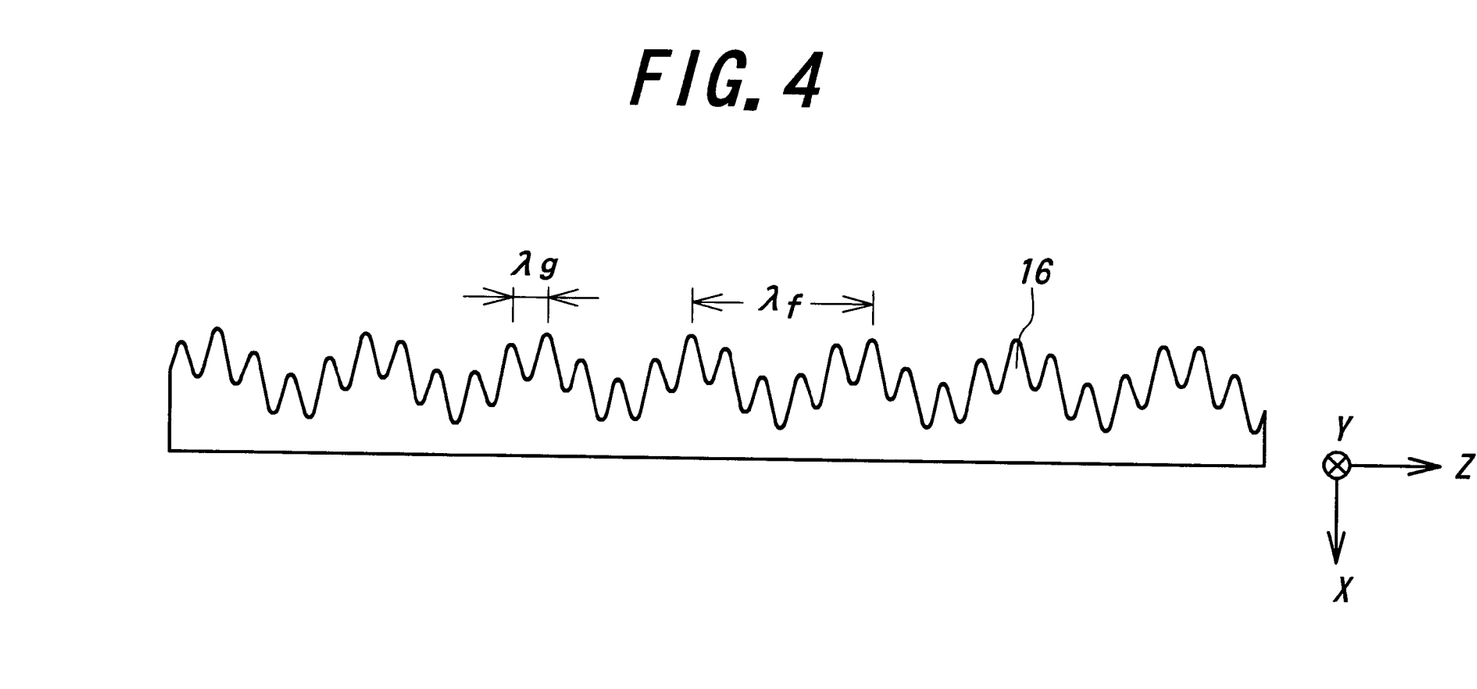
FIG. 4 is a detail drawing of the dielectric waveguide of the electromagnetic wave generator of the second embodiment.

FIGS. 3(a) and 3(b) are a principle diagram and a sectional view taken along the line B—B respectively showing a basic structure of the electromagnetic wave generator according to the second embodiment of the present invention. In FIGS. 3(a) and 3(b) as well as in FIG. 4, X represents the height direction, Y represents the width direction, and Z represents the electron beam travelling direction as shown. The electromagnetic wave generator of the present embodiment consists of an electron emitting section 1 connected to a power source 3 and an oscillating section 15 as shown in FIG. 3(a). As shown in FIG. 3(b), the oscillating section 15 is different from that of the above first embodiment in that the input waveguide does not exist in the shown left end of the dielectric waveguide 16 formed in the electron beam travelling direction (shown z axis direction) on the dielectric substrate 5; and in that the composite wave shaped form is formed on the surface of the dielectric waveguide 16 is as shown in FIG. 4. The other portions are constituted in the same manner as in the above first embodiment.

As shown in the FIG. 4, the surface of the above dielectric waveguide 16 (the plane on the electron beam travelling path side) is processed or machined to the composite wave shaped form in such a manner that the cycle length between adjacent wave shaped forms becomes $\lambda_g$ and the cycle length between wave shaped form groups where the same pattern is repeated becomes $\lambda_f$. Among these, cycle length component $\lambda_g$ specifies the structure for expression (2) above to hold as well as the electromagnetic wave amplifier of the above first embodiment.

On the other hand, cycle length component $\lambda_f$ is selected according to the following expression:

$$\lambda_f = \lambda/(2n) \quad (6)$$

and specifies the structure for reflecting and oscillating the electromagnetic wave by the dielectric waveguide 16. Herein, assuming that the loss coefficient of the dielectric waveguide 16 is $\alpha$, the condition for oscillation is given by the following expression.

$$g \geq \alpha \quad (7)$$

In the electromagnetic wave generator of the present embodiment, with respect to the electron beam 4 emitted from electron emitting section 1 and travelling in a vacuum, the electromagnetic wave is generated in the dielectric waveguide 16 formed in the electron beam travelling direction (z direction) on the dielectric substrate 5 which constitutes the oscillating section 15. A part of the electromagnetic wave is seeped in the vacuum from the dielectric waveguide 16, so that the electromagnetic wave thus seeped is overlapped with the electron beam 4 emitted from the electron emitting section 1 and travelling in the vacuum, thereby causing an electric field (E) component 14 of the electromagnetic wave as shown in FIGS. 3(a) and 3(b). In that case, if cycle length $\lambda_g$ of the wave shaped form on the surface of the dielectric waveguide 16 satisfies the above expression (2), the travelling speed of the electron beam travelling direction of the electromagnetic wave decreases depending on the wave shaped form and effective refractive index n of dielectric waveguide 16, so that the electric field component E of the electromagnetic wave receives energy from the electron beam (the electron beam travels in the vacuum, so energy loss accompanying scattering due to collisions with environmental material is reduced). Here, cycle length $\lambda_f$ satisfies the above expression (6), and if the gain constant g of the dielectric waveguide 16 is more than the loss coefficient α, the above expression (7) is satisfied, so that the electromagnetic wave is reflected by the dielectric waveguide 16 and the oscillation is generated, and thus, the electromagnetic wave becomes output electromagnetic wave 13 in the desired frequency domain (region from the microwave range to an optical region).

Next, by comparing the electromagnetic wave amplifier (electromagnetic wave generator) of the above embodiment achieving the above electromagnetic wave amplification (electromagnetic wave generation), and the above conventional technology and prior applications of the present inventor (U.S. Pat. Nos. 6,195,199, 6,219,175 and 6,301,041), the common points and the different points thereof are explained.

First, the above first embodiment is an element or a device which amplifies the electromagnetic wave in only one direction, so that this embodiment has a function, which is essentially different from "Laser" which is a conventional technology for performing a reversible amplification in both directions.

Second, the principle of the electromagnetic wave amplification in the above respective embodiments is a phenomenon foreseen by a new theoretical analysis according to the present inventor as was the case in the prior applications of the present inventor.

Third, the electromagnetic wave amplifier and the electromagnetic wave generator of the above respective embodiments are fundamentally operable within all ranges from the microwave region to the visible light region.

Fourth, it has some commonality with a "Unidirectional amplifier" of a prior application of the present inventor (Japanese Patent Application Laid-open No. 270808/1998; U.S. Pat. No. 6,219,175) in the point of amplification of the electromagnetic wave due to the electron beam. But, the above respective embodiment is different from the prior application of the present inventor in the point that the prior application utilizes electrons in a solid substance, and the present embodiments utilize electrons in a vacuum.

In addition, the above respective embodiment is different from the prior application of the present inventor in the point that the present embodiment delays the electromagnetic wave by means of the dielectric waveguide having its surface processed in a wave shaped form, and the prior application utilizes a composite shaped dielectric waveguide so as to meander the electromagnetic wave.

Fifth, it has some commonality with an "Electron tube type unidirectional amplifier" of a prior application of the present inventor (Japanese Patent Application No. 293819/1997; U.S. Pat. No. 6,195,199) in the point of amplification of an electromagnetic wave due to an electron beam in a vacuum. But, the above respective embodiment is different from the prior application of the present inventor in the point that the prior application delays the electromagnetic wave by reflecting it between two wave shaped mirrors, and the present embodiment delays the electromagnetic wave by means of the dielectric waveguide having its surface processed in a wave shaped form.

Sixth, it has some commonality with a "Unidirectional amplifier" of a prior application of the present inventor (Japanese Patent Application No. 231251/1998; U.S. Pat. No. 6,301,041) in the point of being an electromagnetic wave amplifier with a waveguide utilizing an electron beam in a vacuum and a dielectric substance. But, the above respective embodiment is different from the prior application of the present inventor in the point that the prior application requires an operating voltage on the order of tens of KV in order to delay the electromagnetic wave using a straight waveguide, and the present embodiment can be operable in an operating voltage of several KV or less in order to delay the electromagnetic wave using the dielectric waveguide having the surface processed to the wave shaped form.

Seventh, the above respective embodiment is similar to a "Traveling wave tube" in the points of amplification of an electromagnetic wave using an electron beam emitted from an electron gun in a vacuum, and of having a delay waveguide of the electromagnetic wave. But, the above respective embodiment is different from the prior application in the point that the traveling wave tube performs the delay of the electromagnetic wave by a spiral (coil shaped) line, but the delay of the electromagnetic wave in the above embodiment is performed by the dielectric waveguide having its surface processed to the wave shaped form. Moreover, the traveling wave tube can be used in the microwave range, but it is not available in a higher frequency region than the sub-millimeter wave.

Eighth, the above respective embodiments are similar to "Free electron laser" and "Cerenkov maser (microwave amplification by stimulated emission of radiation)" in the points that the present embodiment performs electromagnetic wave amplification using an electron beam emitted from an electron gun in a vacuum and is an electromagnetic wave amplifier using the dielectric waveguide. But, the above respective embodiment is different from the prior application in the points that a "Free electron laser" and a "Cerenkov maser" need operating voltages of above 1 MV in order to delay the electromagnetic wave using a cylindrical dielectric waveguide, but the present embodiment can be operable with an operating voltage of several KV or less in order to delay the electromagnetic wave using the dielectric waveguide having its surface processed to the wave shaped form.

As explained above, according to the above respective embodiments, the electromagnetic wave amplifier performing an amplification of a unidirectional electromagnetic wave and the electromagnetic wave generator can be realized. The appearance of such an electromagnetic wave amplifier and an electromagnetic wave generator corresponds to an invention of the electric vacuum tube and a transistor in the optical frequency region so to speak, so that, in addition to continuous progression in optical electronics field for performing signal processing in current micro wave communication, optical communication technique, optical instrumentation technology, and optical recording technology, etc., rapid progress in fields of electrical engineering, electronic engineering, and information engineering can be expected. In addition, the electromagnetic wave amplifier of the above first embodiment can generate the high-energy electromagnetic waves needed in fields such as material manufacturing and nuclear fusion.

A main advantage according to the achievement of the above electromagnetic wave amplifier is that circuit design with optical signals becomes possible, so that various functional devices in the optical region, such as optical oscillators, optical amplifiers, optical modulators, optical switches and optical memory can be formed as optical circuits. For example, when the above electromagnetic wave amplifier is applied to a light source in an optical fiber communication system or is applied to optical measuring systems, troubles caused by reinjection of reflected light may be avoided even if an optical isolator is not used. Moreover, so called feedback induced noise in optical disk systems will be reduced by applying the above amplifier to be an optical pick-up. Furthermore, various optical functional devices, such as optical modulators and optical switches will be available by modifying the amplification condition.

In manufacturing using laser cutters or laser knives, the operation will be stabilized with the introduction of the unidirectional amplification of light based on the present invention.

Moreover, the electromagnetic wave amplifier and the electromagnetic wave generator of above respective embodiments are fundamentally operable within all ranges from the microwave range to the visible light region, so that the amplifier and generator can be applied to not only an optical region and a microwave region but also the terahertz (THz) region or far infrared radiation regions, and thus, up to now undeveloped electromagnetic wave regions (the region of infrared rays from the sub-millimeter wave; frequency band of $10^{11}$–$10^{14}$ Hz) can be utilized. Therefore, the present invention can be applied to devices performing electromagnetic wave generation and amplification in the far infrared light region from the THz band (THz band amplifier, THz band oscillator, far infrared light amplifier, and, for example, far infrared light generator). In this way, when amplification and generation of electromagnetic waves of $10^{11}$–$10^{14}$ Hz become possible, not only can the transmission capacity of communication technology be increased rapidly, but also analysing technology for chemical materials can be developed further.

As shown in FIGS. 1(a) and 1(b), the amplifier according to the present invention comprises an electron emitting section (electron gun) 1 and an amplifying section 2. In a realization of this embodiment, quartz glass is used for the dielectric substrate 5, GaAs is used for the dielectric waveguide 6, and Al is used for the electron beam focusing electrodes 9 and 10. In this constitution, when acceleration voltage 3 is applied to electron gun 1 and electromagnetic wave 12 is input from the input waveguide 7, amplified electromagnetic wave 13 is output from the output waveguide 8. In this case, when the theoretical analysis is performed, the applied voltage 3 (acceleration voltage $V_b$) is $V_b$=2.5 KV because of the far infrared radiation of $\lambda$=100 $\mu$m in the wave length, and electric current density J is J=100 A/cm$^2$, the length L of amplifying section 2 is 3 cm, an amplification factor A of 1000 times or more is obtained.

Moreover, in a realization of the electromagnetic wave generator as shown in FIGS. 3(a) and 3(b), the electron emitting section 1 (electron gun) and the oscillating section 15 are constructed, quartz glass is used for the dielectric substrate 5, GaAs is used for the dielectric waveguide 16, and Al is used for the electron beam focusing electrodes 9 and 10 (see FIG. 3(a)). In this constitution, when acceleration voltage 3 is applied to the electron gun 1, electromagnetic wave 13 (see FIG. 3(b)) is output from output waveguide 8. In this case, on theoretical analyzing, in the case that the cycle length is $\lambda_f$=29.4 $\mu$m, the applied voltage 3 (acceleration voltage $V_b$) is $V_b$=2.5 KV, the electric current density J is J=100 A/cm$^2$, and the length L of the amplifying section 2 is 3 cm, the far infrared light of wave length $\lambda$=100 $\mu$m is obtained by expression (7).

What is claimed is:

1. An electromagnetic wave amplifier arranged in a vacuum environment, comprising:

an electron emitting section for emitting electron beams; and an amplifying section for amplifying an inputted electromagnetic wave in one direction by utilizing energy received from an electron beam emitted from the electron emitting section and travelling in the vacuum, the amplifying section comprising:

a dielectric substrate having a dielectric waveguide disposed thereon in an electron beam travelling direction, the surface of the dielectric waveguide having a wave shaped form of a given periodic length so as to decrease the travelling speed of the electromagnetic wave in the electron beam travelling direction; and a pair of electron beam focusing electrodes oppositely arranged to clip the dielectric waveguide, the dielectric waveguide causing an electric field component of the electromagnetic wave in the electron beam travelling direction by overlapping a part of the inputted electromagnetic wave and the electron beam emitted from the electron emitting section.

2. An electromagnetic wave amplifier as claimed in claim 1, wherein the dielectric substrate further comprises:

an input waveguide; and an output waveguide, the input waveguide and output waveguide being connected to respective ends of the dielectric waveguide through curved portions in a direction orthogonal to the electron beam travelling direction.

3. An electromagnetic wave amplifier as claimed in claim 2, wherein the dielectric waveguide comprises a material of high refractive index having transparency in a desired wave length region, the material comprising at least one of a II–VI group compound semiconductor and a III–V group compound semiconductor when using the dielectric waveguide for the visible light region and comprising at least one of a IV group, a II–VI group compound semiconductor, and a III–V group compound semiconductor when using the dielectric waveguide from the microwave range to the near infrared light region.

4. An electromagnetic wave amplifier as claimed in claim 1, wherein the dielectric waveguide comprises a material of high refractive index having transparency in a desired wave length region, the material comprising at least one of a II–VI group compound semiconductor and a III–V group compound semiconductor when using the dielectric waveguide for the visible light region and comprising at least one of a IV group semiconductor, a II–VI group compound semiconductor, and a III–V group compound semiconductor when using the dielectric waveguide from the microwave region to the near infrared region.

5. An electromagnetic wave generator arranged in a vacuum environment and comprising:

an electron emitting section for emitting electron beams; and an oscillation section for generating an electromagnetic wave by utilizing electron beams emitted from the electron emitting section and travelling in the vacuum, the oscillation section comprising:

a dielectric substrate having a dielectric waveguide disposed thereon in an electron beam travelling direction, the surface of the dielectric waveguide having a composite wave shape provided by combining wave shaped forms of two kinds of cycle lengths in order to decrease the travelling speed of an electromagnetic wave in the electron beam travelling direction, the composite wave shape also provided so as to cause a gain coefficient of the electromagnetic wave generator due to the electron beam to be greater than a loss coefficient of the dielectric waveguide; and a pair of electron beam focusing electrodes oppositely arranged to clip the dielectric waveguide, wherein the dielectric waveguide generates an electric field component of the electromagnetic wave in the electron beam travelling direction by overlapping a part of an electromagnetic wave generated from the electron emitting section and travelling in the vacuum and the electron beams emitted from the electron emitting section.

6. An electromagnetic wave generator as claimed in claims 5, wherein the dielectric waveguide comprises a material of high refractive index having transparency in an operating wave length region, the material comprising at least one of a II–VI group compound semiconductor and a III–V group compound semiconductor when using the dielectric waveguide for the visible light region and comprising at least one of a IV group semiconductor, a II–VI group compound semiconductor, and a III–V group compound semiconductor when using the dielectric waveguide from the microwave region to the near infrared light region.

7. An electromagnetic wave generator as claimed in claim 5, wherein the dielectric substrate further comprises:

a power output waveguide connected to a terminal portion of the dielectric waveguide through a curved part disposed in a direction orthogonal to the electron beam travelling direction.

8. An electromagnetic wave generator as claimed in claim 7, wherein the dielectric waveguide comprises a material of high refractive index having transparency in an operating wave length reion, the material comprising at least one of a II–VI group compound semiconductor and a III–V group compound semiconductor when using the dielectric waveguide for the visible light region and comprising at least one of a IV group semiconductor, a II–VI group compound semiconductor, and a III–V group compound when using the dielectric waveguide from the microwave range to the near infrared light region.

* * * * *